United States Patent [19]

Tojima

[11] Patent Number: 5,048,659
[45] Date of Patent: Sep. 17, 1991

[54] CLUTCH DISC
[75] Inventor: Horimi Tojima, Neyagawa, Japan
[73] Assignee: Kabushiki Kaisha Daikin Seisakusho, Osaka, Japan
[21] Appl. No.: 593,354
[22] Filed: Oct. 2, 1990

Related U.S. Application Data

[63] Continuation of Ser. No. 382,445, Jul. 20, 1989, abandoned.

[30] Foreign Application Priority Data

Aug. 5, 1988 [JP] Japan .......................... 63-104183[U]

[51] Int. Cl.⁵ ...................... F16D 13/68; F16D 69/04
[52] U.S. Cl. ........................... 192/107 C; 192/107 M
[58] Field of Search ............ 192/107 R, 107 C, 107 M

[56] References Cited

U.S. PATENT DOCUMENTS 2,888,122  5/1959  Garmager ...................... 192/107 C
3,696,902  10/1972 Dantele ........................... 192/107 C
4,260,048  4/1981  Beccaris ......................... 192/107 C
4,278,162  7/1981  Frichette et al. ............... 192/107 C
4,375,254  3/1983  Lech, Jr. ......................... 192/107 C
4,377,225  3/1983  Lech, Jr. et al. ............... 192/107 C
4,529,078  7/1985  Keck ............................... 192/107 C
4,846,329  7/1989  Kettell et al. .................. 192/107 M Primary Examiner—Richard Lorence
Attorney, Agent, or Firm—Armstrong, Nikaido, Marmelstein, Kubovcik & Murray

[57] ABSTRACT

A clutch disc including a pad-type ceramic metal friction member fixed by a plurality of rivets to the surface of a driven plate which functions as an inputside member of the clugch disc, and an axially elastically deformable cushioning plate interposed between the friction member and the driven plate, wherein the rivets are disposed in corresponding holes opening through the surface of the friction member.

3 Claims, 1 Drawing Sheet

U.S. Patent
Sep. 17, 1991
5,048,659
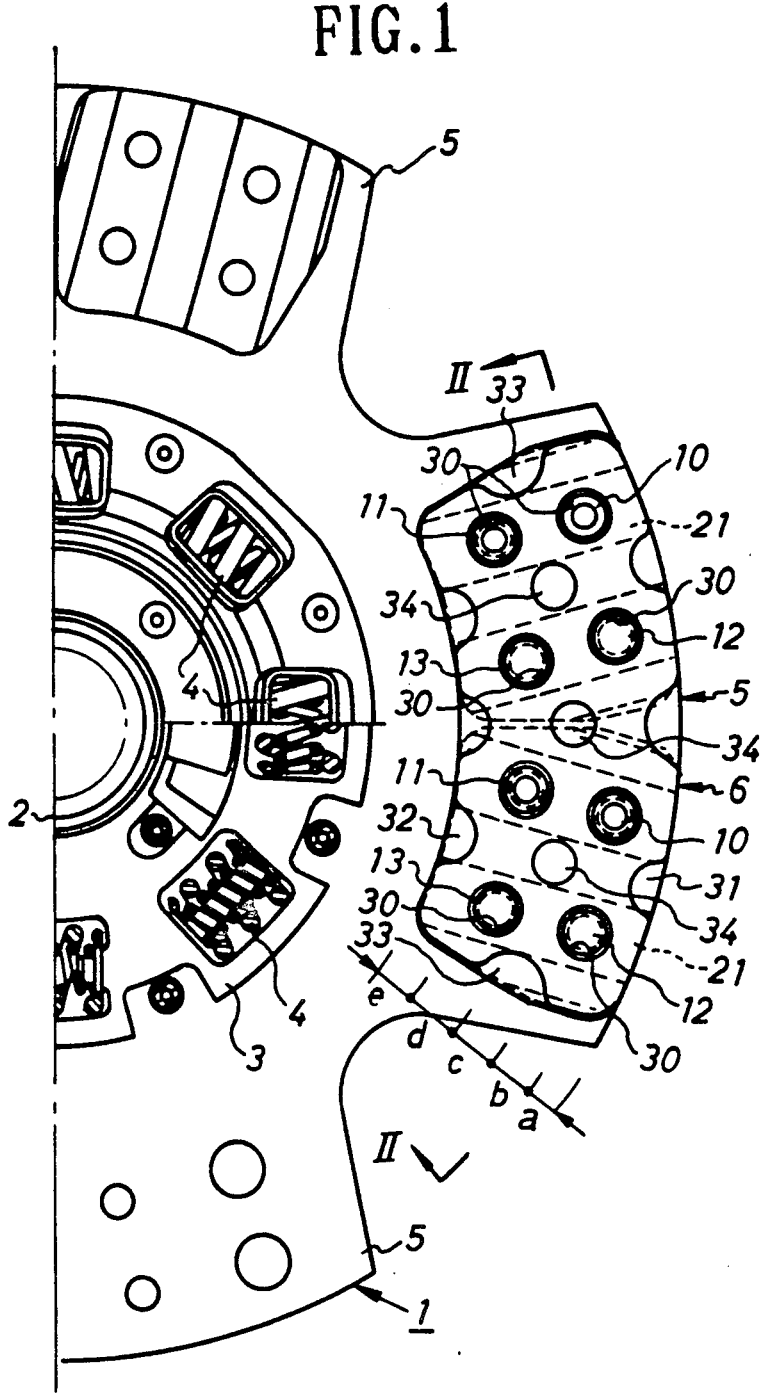
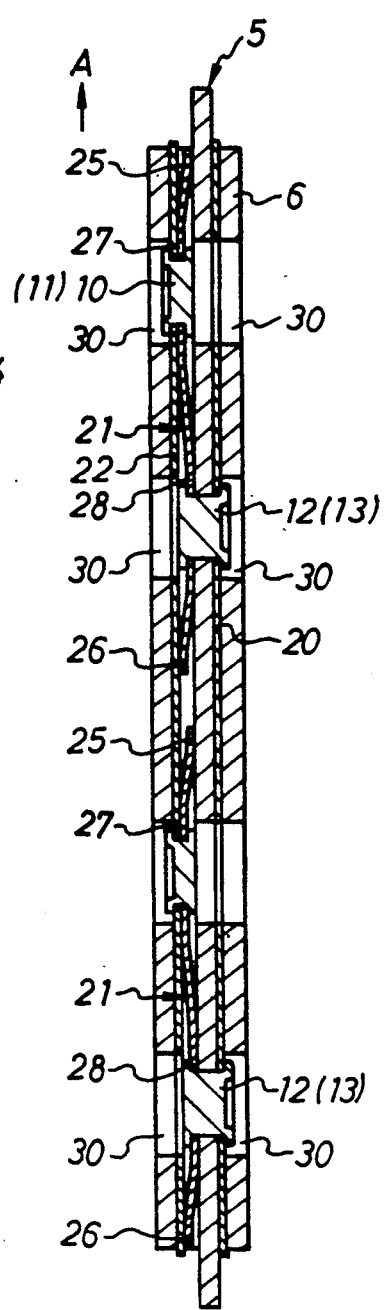

CLUTCH DISC

This application is a continuation of application Ser. No. 382,445 filed July 20, 1989 now abandoned.

BACKGROUND OF THE INVENTION

1. Field of the Invention

This invention relates to a clutch disc for use in automotive friction clutches or the like and, more particularly, to a clutch disc using a pad-type ceramic metal (sintered alloy) friction material as a friction facing.

2. Description of the Prior Art

Clutch discs of this type are described in Japanese Patent Publication No. 51-22202 and British Patent Application No. 8407046 (OP1 No. 2141190). In these prior art clutch discs, a ceramic metal friction member is fixed to a driven plate (or an input plate in the clutch disc) through a cushioning plate. The cushioning plate is axially compressible and, therefore, by the cushioning plate being compressed during a clutch engagement, an abrupt axial force of pressure contact between the friction member and a flywheel can be buffered, it being thus possible to prevent any unreasonable shock from being developed during the clutch engagement.

In these clutch discs, however, the cushioning plate projects circumferentially at opposite sides in relation to the friction member and is fixed at the projecting portions by rivets to the driven plate. This means that the cushioning plate is larger in size than the friction member; in other words, it is required that the friction member be somewhat smaller sized than the cushioning plate. Therefore, one disadvantage of such clutch disc is that the cushioning plate is comparatively large in weight, and another disadvantage is that the surface area (effective pressure contact area) of the friction member is comparatively small.

This object of this invention is to solve these problems.

SUMMARY OF THE INVENTION

In order to accomplish this object, this invention provides a clutch disc including a pad-type ceramic metal friction member fixed by a plurality of rivets to the surface of a driven plate which functions as an input-side member of the clutch disc, and an axially elastically deformable cushioning plate interposed between the friction member and the driven plate, characterized in that said rivets are disposed in corresponding holes opening through the surface of said friction member.

BRIEF DESCRIPTION OF THE DRAWINGS

FIG. 1 is a partially cutaway segmentary view in plan of a clutch disc embodying the invention; and FIG. 2 is an enlarged sectional view taken along the lines II—II in FIG. 1.

DESCRIPTION OF THE PREFERRED EMBODIMENTS

Referring to FIG. 1, a driven plate 1, an input member of the clutch disc, is connected by means of a plurality of damper springs 4 to a flange 3 of a hub 2, an output member, in a well-known way. The driven plate 1 has a number of (e. g., 4) radially outwardly protruding projections 5 integrally formed therewith. Each projection 5 extends relatively long in the circumferential direction of the clutch disc. A pair of ceramic metal friction members 6 are fixed by means of rivets 10-13 to both sides of each projection 5 in such manner as will be hereinafter described. The configuration of each friction member 6 is substantially same as that of the projection 5, and in the embodiment illustrated the projection 5 protrudes at circumferentially opposite ends thereof slightly beyond the friction members 6.

In FIG. 2, each friction member 6 at the flywheel or input side (at the righthand side in FIG. 2) is mounted to the projection 5 through a core plate 20. The core plate 20 is a flat plate having generally same dimensions and shape as the friction member 6. The friction member 6 is securely fixed to the core plate 20 over its entire surface through adhesive bonding or otherwise. The opposite side of the core plate 20 relative to the friction member 6 is held in close contact with the projection 5 over its entire area, being fixed by rivets 12, 13 to the projection 5.

Each friction member 6 at the opposite side (i. e., at the pressure plate side) is fixed to the corresponding projection 5 through two cushioning plates 21 and one core plate 22 which are disposed between the friction member 6 and the projection 5. The core plate 22 is a flat plate having same dimensions and shape as the above mentioned core plate 20, and the friction member 6 is securely fixed to one side of the core plate 22 over its entire area through adhesive bonding or otherwise. The two cushioning plates 21 are arranged in the circumferential direction, being positioned between the core plate 22 and the projection 5. The cushioning plates 21 are generally similar in size and shape to the core plate 22, but as can be seen from FIG. 2, they are bent or curved in their circumferential section and fixed to the projection 5 and core plate 22, as will be hereinafter described, so as to be ready for being axially compressed.

In FIG. 2, the direction of arrow A represents the direction of rotation of the clutch disc and numeral 25 designates the front end portion of each cushioning plate 21 in the direction of rotation A, the rear end portion of the cushioning plate 21 being designated by numeral 26. In the non-compressed condition (disconnected clutch condition) as shown, the front end portion 25 is in contact with the surface of the projection 5 so that it is away from the core plate 22. The rear end portion 26 is in contact with the core plate 22, being thus away from the projection 5. A crest portion 27 adjacent the front end of the cushioning plate 21 is fixed by rivets 10, 11 as it is held in close contact with the core plate 22, while a bottom portion 28 adjacent the rear end of the cushioning plate 21 is fixed to the projection 5 by rivets 12, 13.

In order to fix the rivets 10-13 in position as above noted, the projection 5, core plates 20, 22 and cushioning plates 21 are provided with holes for rivet insertion or rivet mounting, and the friction members 6 are also provided with holes 30 opening through their surface. In addition to these holes 30, each friction member 6 is provided with notches 31-34 as shown in FIG. 1 which are open through its friction surface.

In FIG. 1, if the friction member 6 is segmented into five radially extending sections a-e (i.e., sections extending in the circumferential direction of the clutch disc), the rivets 10 and 12 are arranged in alternate intervals in circumferentially spaced relation in section b adjacent the outer periphery. The rivets 11 and 13 are arranged in alternate intervals in circumferentially spaced relation in section d adjacent the inner periphery. Notches 31 are provided at three locations in circumferentially spaced relation in the outermost section a. Notches 32 are provided at three locations in circumferentially spaced relation in the innermost section e. Notches 33 are provided at circumferentially opposite end portions of the friction member 6 in section c, a radially median section. Notches 34 are provided at three locations in circumferentially spaced relation in the median section c.

In the embodiment illustrated, notches 31-33 are generally semi-circular notches opening through edge portions of the friction member 6, and notches 34 are circular notches (or holes) opening through the surface of the friction member 6. It is understood, however, that these notches may be varied in configuration in various ways; for example, notches 34 may be configured to be radially ellipsoidal. The notches 31, 32, and 34 are arranged at circumferentially staggered positions relative to the rivets 10-13, but their positions may be varied.

The provision of notches 31-34 as above described means that either holes 30 or notches 31-34 are arranged in scattered condition on the friction surface of each friction member 6 in sections a-e, with the result that the effective friction area of the friction member 6 in each of the sections a-e can be generally equalized. Therefore, in each clutch engagement operation, the operating conditions (such as transmission torque, force of pressure contact, and slide condition) in the area of pressure contact between the flywheel and the pressure plate on one hand and the friction members 6 on the other hand are generally equalized, the surface of pressure contact being thus prevented from being subjected to local wear.

According to the arrangement of the invention as above described, rivets 10-13 are accommodated within holes 30 opening through the surface of each friction member 6 to thereby eliminate the need for the cushioning plates 21 projecting circumferentially relative to the friction member 6. Thus, the cushioning plates 21 can be compacturized and reduced in weight, and further the effective pressure contact area of the friction member 6 can be increased.

Furthermore, in the embodiment shown wherein friction contact areas of various radial portions of the friction member 6 are generally equalized, such inconvenience that friction contact surfaces of the friction member 6, flywheel, and pressure plate are noticeably subject to radially local wear can be eliminated.

What is claimed is:

1. A clutch disc having a driven plate, first and second ceramic metal friction members each bonded to a core plate and positioned at an input side and an opposite side, respectively, of said driven plate and axially deformable cushioning plates interposed between said core plate bonded to said second friction member and said opposite side of said driven plate.

said core plate bonded said first ceramic friction member and said cushioning plates being fastened with a plurality of first rivets to the input side and opposite side, of said driven plate, said core plate bonded to said second ceramic friction member and said cushioning plates being fastened with a plurality of second rivets, said first and second rivets being disposed within aligned holes opening through said friction members bonded on said respective core plates and extending through said core plates and said driven plate therebetween.

2. A clutch disc as defined in claim 1 wherein a plurality of notches and holes are provided on said respective friction members at staggered positions relative to said holes in which said first and second rivets are disposed.

3. A clutch disc as defined in claim 1 wherein said cushioning plates said core plate bonded to said first friction member and the bottom portions of said cushioning plates are fastened with said first rivets to opposite sides of said driven plate, said core plate bonded to said second friction member and the crest portions of said cushioning plates being fastened with said second rivets.

* * * * *

UNITED STATES PATENT AND TRADEMARK OFFICE
CERTIFICATE OF CORRECTION

PATENT NO. : 5,048,659

DATED : September 17, 1991

INVENTOR(S) : Hiromi TOJIMA

It is certified that error appears in the above-identified patent and that said Letters Patent is hereby corrected as shown below:

On the cover page, Item [75], "Horimi Tojima" should read --Hiromi Tojima--.

Signed and Sealed this

Twenty-third Day of March, 1993

Attest:

STEPHEN G. KUNIN

Attesting Officer

Acting Commissioner of Patents and Trademarks